United States Patent [19]

Matsuda et al.

[11] Patent Number: 5,069,949

[45] Date of Patent: Dec. 3, 1991

[54] MAGNETIC RECORDING MEDIUM

[75] Inventors: Atsuko Matsuda; Narito Goto, both of Hino, Japan

[73] Assignee: Konica Corporation, Tokyo, Japan

[21] Appl. No.: 378,165

[22] Filed: Jul. 11, 1989

[30] Foreign Application Priority Data

Jul. 14, 1988 [JP] Japan .................. 63-175682

[51] Int. Cl.$^5$ ............................................. G11B 23/00
[52] U.S. Cl. .................................... 428/141; 428/143; 428/332; 428/480; 428/694; 428/900
[58] Field of Search ............... 428/141, 143, 480, 694, 428/900, 332

[56] References Cited

U.S. PATENT DOCUMENTS

| 4,505,966 | 3/1985 | Adachi et al. | 428/694 |
| 4,663,209 | 5/1987 | Honuma et al. | 428/480 |
| 4,710,421 | 12/1987 | Ono et al. | 428/480 |
| 4,720,412 | 1/1988 | Katoh et al. | 428/450 |
| 4,781,964 | 11/1988 | Mizuno et al. | 428/694 |
| 4,804,736 | 2/1989 | Utsumi et al. | 428/480 |
| 4,952,441 | 8/1990 | Kawamata et al. | 128/694 |

Primary Examiner—Paul J. Thibodeau
Attorney, Agent, or Firm—Jordan B. Bierman

[57] ABSTRACT

A magnetic recording medium having a support and provided thereon a magnetic layer is disclosed. The support of the medium concerned comprises physical properties of:

a. a thickness: not more than 15.5 μm,
b. a number of a protuberance having a height of not lower than 0.1 μm: not more than 30/mm$^2$,
c. a surface roughness: 0.04 to 0.09 μm,
d. a Young's modulus in a machine direction: not less than 550 kg/mm$^2$,
e. a fracture strength in a machine direction: not less than 30 kg/mm$^2$, and
f. an elongation: not less than 60%, and the magnetic layer comprises physical properties of:

g. a surface roughness: not more than 0.09 μm,
h. a Young's modulus in a machine direction: not less than 400 kg/mm$^2$.

2 Claims, No Drawings

MAGNETIC RECORDING MEDIUM

FIELD OF THE INVENTION

This invention relates to a magnetic recording medium and, more particularly, to a magnetic recording medium which comprises an excellent running durability and can record in a high density.

BACKGROUND OF THE INVENTION

Magnetic recording media have been encouraging an extensive demand in accordance with advance and diversification of magnetic recording apparatuses, and have been widely applied to video tapes, audio tapes and so forth.

A running durability is requested to magnetic recording media because of repeated use, and in recent years, the magnetic recording media capable of recording in a high density is strongly demanded.

Usually, a magnetic recording medium is comprised of a non-magnetic support having thereon a magnetic layer, and conventionally a running durability thereof has been improved by strengthening the support.

However, numberless fine protuberances usually existing on the surfaces of most non-magnetic supports make it difficult to form thereon a magnetic layer with a uniform thickness, and to provide a magnetic recording medium capable of recording in a high density.

Further, the protuberances are liable to be exposed on a surface of a magnetic layer, and the exposed protuberances are sometimes cut to small pieces in the course of a calender treatment, which are transferred to the magnetic layer.

The exposed protuberances and the transferred small protuberances are liable to result in poor performances of a recording medium.

On the other hand, a magnetic recording medium using a non-magnetic support without any protuberances sometimes has such problems in running durability as edge folding.

SUMMARY OF THE INVENTION

It is an object of the invention to provide a magnetic recording medium capable of recording in a high density and comprising the excellent electromagnetic conversion characteristics, with reduced drop-out and improved running durability.

The above object can be achieved by the magnetic recording medium comprising a non-magnetic support having a layer thickness, a number of protuberances each having a regular height, a surface roughness, a Young's modulus, a fracture strength, and an elongation, each controlled in the specific ranges, and provided thereon a magnetic layer having a surface roughness and a Young's modulus each controlled in the specific ranges.

DETAILED DESCRIPTION OF THE INVENTION

The magnetic recording medium of the invention is characterized by the non-magnetic support having a thickness of not more than 15.5 $\mu$m, the protuberances of 30 mm$^2$ with a height of not lower than 0.1 $\mu$m, a surface roughness (Rz) of 0.04 to 0.09 $\mu$m, a Young's modulus of not less than 550 kg per mm$^2$ in a machine direction, a fracture strength of not less than 30 kg per mm$^2$ in a machine direction, and an elongation of not less 60%; and also characterized by the magnetic layer having a surface roughness (Rz) of not more than 0.09 $\mu$m, and a Young's modulus of not less than 400 kg per mm$^2$ in a machine direction.

A follows are explained detailedly by the respective elements composing of the invention.

Non-magnetic support

The raw materials for the above-mentioned non-magnetic support include polyester such as polyethylene terephthalate and polyethylene-2,6-naphthalate; polyolefin such as polypropylene; and a cellulose derivative such as cellulose triacetate and cellulose diacetate.

A support is prepared in the following manner; Polyethylene terephthalate (PET), polyamide or polyethylene-2,6-naphthalate each fused at a high temperature is extruded on a cooling drum for filming; then, the film is subjected to vertical and horizontal biaxial orientation, and further to vertical orientation for improving the mechanical properties.

A surface roughness Rz of a support is controlled in the following manner; Rz can be changed by a form, size and addition amount of an inorganic particle such as titanium dioxide, calcium carbonate and talc incorporated into the support; for example, a film containing a particle with a particle size of 100 m$\mu$ comprises smaller Rz than that of a film containing a particle with a particle size of 1 $\mu$m, provided that the addition amounts are the same; a spherical particle is more liable to expose on a surface of the support in orientation than a tabulor particle, which will result in larger Rz of the former particle, however, Rz is changeable by heavier orientation because the tabular particle is oriented lengthwise.

By incorporating an inorganic particle having a different particle size in a different amount, a surface roughness of a support can be controlled. Also, a stretching intensity makes it possible to change a surface condition from protuberance to dimple. By combining the preceding modes, the surface roughness of the support can be controlled variously.

The prior arts include Japanese Patent O.P.I. Publication No. 62-43826/1987 in which the Young's moduli of a magnetic recording layer and a support, and a centerline average surface roughness Ra of a back surface of the support are controlled; and Japanese Patent O.P.I. Publication No. 62-89217/1987 in which height and distribution of a protuberance on a surface of a magnetic layer, and Ra are controlled.

In the meantime, the surface conditions of a magnetic layer and a support can be represented more distinctly and accurately by a surface roughness Rz averaging ten points. Further, a protuberance of the support is liable to affect a surface condition of a magnetic layer, and therefore, it is necessary to control both surface roughnesses.

Furthermore, in a slitting process, a heavy tensile force is exerted to a film when a slitter edge contacts a film surface, and if a fracture resistance and an elongation of the film is small, the film edges cut by the slitter will produce fragments of a coated layer, which in turn will result in stain of a nonwoven fabric in a wiping process following the slitting process, or will be elongated to cause a durability deterioration.

It is, therefore, required to specify not only a Young's modulus, but the values of fracture resistance and elongation for identifying a film strength.

There is no special limitation to a form of the supports, and any form such as a tape and a sheet may be applicable.

The thickness of the support is not more than 15.5 μm, more preferably 7.5 to 15.5 μm.

In a standard of 120 minutes recording time, the thickness is preferably 12 to 15.5 μm, and in a standard of 160 minutes recording time, 7.5 to 15.5 μm.

The thickness exceeding 15.5 μm may result in poor electromagnetic conversion characteristics.

The number of the protuberances having a height of not lower than 0.1 μm is preferably not more than 30 per mm², and the number exceeding this level is liable to result in an ununiform thickness, incompatibility with a high density recording, and higher frequency of dropout because of the exposed protuberances produced by calender treatment.

The number of the protuberances per mm² on a surface of the non-magnetic support was determined by measuring three sites selected at random with a roughness analyzer Model SE-3FK manufactured by Kosaka Laboratories Inc. to draw the surface conditions per mm² on a three-dimensional chart, and by taking an average of the number of the protuberances in each site.

The height of the protuberances was determined by analyzing the three-dimensional chart.

The surface roughness Rz (hereinafter referred to as Rz) of the support is 0.04 to 0.09 μm.

Rz less than 0.04 μm is liable to result in less smooth running and higher frequency of edge folding of the magnetic recording medium. Meanwhile, Rz exceeding 0.09 μm is liable to result in causing drop-out due to small pieces produced by calender treatment and transferred on a surface of a magnetic layer.

Rz of the support is calculated from a profile obtained by measuring randomly selected three points with the preceding roughness analyzer at a measuring distance of 2.5 mm. Rz of a magnetic layer can be obtained likewise.

The Young's modulus of the support in a machine direction is not less than 550 kg/mm², and that of less than 550 kg/mm² is liable to increase a frequency of edge folding.

This Young's modulus is a value obtained by dividing with a distortion rate (0.01) a tension exerted for 1% elongation, which is measured with a Tensiron manufactioned by Toyo-Baldwin Co.

The fracture strength of the support in a machine direction is not less than 30 kg/mm², and that of less than 30 kg/mm² is liable to increase a frequency of edge folding.

This fracture strength is a tension in fracture measured with Tensiron.

The elongation of the support in a machine direction is not less than 60%, and that of less than 60% is liable to increase a frequency of edge folding.

This elongation is an elongation in fracture in measuring the fracture strength. A Young's modulus of a magnetic layer in a machine direction is not less than 400 kg/mm², and that of less than 400 kg/mm² is liable to deteriorate running durability because of shaved magnetic layer caused by depressed strength of a coated magnetic layer. A Young's modulus of the magnetic layer is calculated from that of a magnetic recording medium having a magnetic layer coated on a support. A Young's modulus, Et, of the medium is measured in the same manner as the support, and a thickness, Tt, is measured with a micrometer. A Young's modulus, Emc, of the magnetic layer can be caluculated by substituting the foregoing values for the following equation, provided that Eb, Tb and Tmc are a Young's modulus and a thickness of the support, and a thickness of the magnetic layer, respectively.

$$Emc = \frac{Tt}{Tmc} \times Et - \frac{Tb}{Tmc} \times Eb$$

Magnetic layer

On the support is provided a magnetic layer comprising a ferromagnetic powder dispersed in a binder.

The ferromagnetic powder includes a cobalt-containing iron oxide powder such as Co-containing $\gamma$-$Fe_2O_3$ Co-containing $Fe_3O_4$ and Co-containing $FeO_x$ ($4/3 < x < 3/2$); iron oxide such as $\gamma$-$Fe_2O_3$ and $Fe_3O_4$; a ferromagnetic alloy powder comprising mainly a ferromagnetic metal of Fe, Ni and Co, such as Fe-Al, Fe-Al-P, Fe-Ni-Co, Fe-Mn-Zn, Fe-Ni-Zn, Fe-Co-Ni-Cr, Fe-Co-Ni-P, Co-Ni and Co-P.

Among them, the preferable one is a cobalt-containing iron oxide powder, and more preferable one is Co-containing $\gamma$-$Fe_2O_3$ powder.

There is no special limitation to a particle form of the ferromagnetic posder, and it may be a needle, a sphere and a spindle.

A longitudinal size of the ferromagnetic particle is usually not larger than 0.4 μm, and preferably not larger than 0.3 μm.

A specific surface area of the ferromagnetic powder measured in a BET method is not less than 38 m²/g, and preferably 40 to 30 m²/g.

The specific surface area less than 38 m²/g is liable to increase a scratch noise and disagree with high density recording.

Any resins having an average molecular weight of about 10000 to 200000 can be used as the above-mentioned binder.

The binder includes a urethane polymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinylbutyral, a cellulose derivative such as cellulose acetatebutylate, cellulose discetate, cellulose propionate and nitrocellulose, a styrene-butadience copolymer, a polyester resin, various kinds of a synthetic rubber binder, a phenol resin, an epoxy resin, a urea resin, a melamine resin, a silicone resin, an acrylic reactive resin, a mixture of a high molecular polyester resin and an isocyanate prepolymer, a mixture of polyester polyol and polyisocyanate, a urea-formaldehyde resin, a mixtures of low molecular glycol and high molecular diol; and the mixture thereof.

Among those binders, the preferable ones are a urethane polymer and a vinyl chloride-vinyl acetate copolymer.

The above-given resins are allowed to comprise a hydrophilic polar group such as $-OS_3M$, $-COOM$ and $-PO(OM^1)(OM^2)$, wherein M represents a hydrogen atom or an alkali metal, and $M^1$ and $M^2$ each represent a hydrogen atom, an alkali metal and a hydrocarbon residue, provided $M^1$ and $M^2$ may be same or different.

In this invention, durability of a magnetic layer can be improved by adding a polyisocyanate type harderner to a binder resin.

The polyisocyanate hardener includes bifunctional isocyanate such as tolylene diisocyanate, diphenylmethane diisocyanate, and hexane diisocyanate; trifunctional isocyanates such as Colonate L (a trade-name, manufactured by Japan Urethane Industrial Co.) and Desmodule L (a trade name, manufatured by Bayer AG.); a conventional hardener such as a urethane prepolymer having isocyanate groups at both terminals; and polyisocyanate applicable as a hardener.

An addition amount of the hardner is usually 5 to 80 parts by weight to the total amount of the binders.

In a magnetic layer, a ratio of a ferromagnetic powder to a binder including a hardener is usually 1-200 to 100, and more preferably 1-50 to 100. Too much binder is liable to depress a recording density of a medium because of a relatively reduced amount of a ferromagnetic powder.

Too little binder is liable to lower a Young's modulus of a magnetic layer and therefore result in reduced durability of a magnetic recording medium.

The magnetic recording medium of the invention is allowed to contain an abrasive, a lubricant, and an antistatic agent in the magnetic layer thereof.

The abrasive includes an inorganic powder such as aluminium oxide, titanium oxide (TiO and $TiO_2$), $\alpha$-iron oxide, silicon oxide (SiO and $SiO_2$), silicon carbide, zinc oxide, celium oxide, magnesium oxide, silicon nitride, zirconium oxide, chromium oxide and boron carbide; and organic powder such as a benzoguanamine resin, a melamine resin, and a phthalocyanine compound.

A particle size of the abrasive is usually 0.01 to 1.0 μm.

A ratio of the abrasive to a ferromagnetic powder is usually 2-10 to 100.

The lubricant applicable to the invention includes a fatty acid and a fatty ester.

A synergism of the fatty acid and the fatty acid ester in a combined use can create the advantages of improved lubrication, scratch noise, still durability and running stability. In this case, an amount of the fatty acid is usually 0.2 to 10 parts by weight to 100 parts by weight of a ferromagnetic powder, and more preferably 0.3 to 8.0 parts by weight.

The amount less than 0.2 parts by weight is liable to result in deteriorated electromagnetic conversion properties due to inferior dispersion and flocculation of a ferromagnetic powder, while the amount exceeding 10 parts by weight is liable to result in leaked fatty acid and lowered output power.

An amount of the fatty ester added is usually 0.1 to 10 parts by weight to 100 parts by weight of a ferromagnetic powder, and preferably 0.2 to 8.5 parts by weight.

The amount less than 0.1 parts by weight is liable to result in deteriorated durability, while the amount exceeding 10 parts by weight is liable to result in leaked fatty ester and depressed output powder.

In view of the preceding synersism, a weight ratio of a fatty acid to a fatty ester is preferably 10/90 to 90/10. As the fatty acid comprises a dispersive effect, it is possible that an amount of the other dispersants having a lower molecular weight is reduced by using the fatty acid and that a Young's modulus of a magnetic recording medium is improved as much as the reduced amount of the dispersants.

The fatty acid may be monobasic or dibasic, and comprises preferably carbon atoms of 6 to 30 and more preferably 12 to 22. The fatty acid includes caproic acid, caprylic acid, capric acid, lauric acid, myristic acid, palmitic acid, stearic acid, isostearic acid, linolenic acid, linolic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid, and octanedicarboxylic acid.

The fatty ester includes oleyl oleate, isocetyl stearate, dioleyl maleate, butyl stearate, butyl palmitate, butyl myristate, octyl palmitate, amyl palmitate, isobutyl oleate, stearyl stearate, lauryl oleate, octyl oleate isobutyl oleate, 2-ethylhexyl stearate, ethyl stearate, 2-ethylhexyl palmitate, isopropyl palmitate, isopropyl myristate, butyl laurate, cetyl-2-ethyl hexarate, dioleyl adipate, diethyl adipate, diisobutyl adipate, and diisodecyl adipate.

Besides the fatty acids and the fatty esters, there can be applied to the invention the other lubricants such as silicone oil modified with carboxylic acid or ester, graphite, fluorocarbon, molybdenum disulfide, tungsten disulfide, fatty acid amide, and $\alpha$-olefin oxide.

They may be used independently or in combination.

The lubricant is used usually in an amount of 0.05 to 10 parts by weight to 100 parts by weight of a ferromagnetic powder.

The antistatic agent includes a conductive powder such as graphite, carbon black, a tin oxide-antimony oxide compound, a tin oxide-titanium oxide-antimony oxide compound, and a polymer grafted with carbon black; a natural surfactant such as saponin; a nonionic surfactant such as an alkylene oxide type, a glycerol type, and a glycidol type; a cationic surfactant such as a higher alkylamine, a quaternary pyridine, other heterocyclic compounds, phosphonium, and sulfonium; an anionic surfactant having the acidic groups of carboxylic acid, sulfonic acid, phosphoric acid, sulfate, and phosphate; an amphoteric surfactant such as amino acid, aminosulfonic acid, and sulfate and phosphate of aminoalcohol.

They may be used either independently or in combination.

The antistatic agent is used usually in an amount of 0.5 to 20 parts by weight to 100 parts by weight of a ferromagnetic powder.

Backing layer

On an opposite side of a magnetic layer, it is allowed to provide a backing layer containing a binder and a filler.

A backing layer functions for improving running property of a magnetic recording medium, preventing electrification and transfer, and so forth.

The same resins as given in the magnetic layer can be used as a binder.

The backing layer may contain a lubricant and an antistatic agent.

The same lubricants and antistatic agents as used in the magnetic layer may be used.

The filler includes carbon black, the powders of $SiO_2$, $TiO_2$, CaO, $\alpha$-$Fe_2O_3$, $Cr_2O_3$, $Al_2O_3$, $Al(OH)_3$, $BaSO_4$, $CaCO_3$, MgO, $BaCO_3$, ZnO, CuO, and $CuO_2$.

In view of the antistatic and light-shielding properties, carbon black is preferable.

It is also allowed to provide an interlayer such as an adhesive layer between a magnetic layer and a support for improving adhesiveness of the magnetic layer to the support.

Next, how to prepare a magnetic recording medium of the invention will be detailed.

Preparation process

The magnetic recording medium of the invention having a specific strength and Rz can be prepared by coating a magnetic coating solution containing a ferromagnetic powder, a binder and the other components mixed and dispersed in a solvent on a non-magnetic support having the preceding characteristics to form thereon a magnetic layer and the other layers.

The solvent for mixing and dispersing the components for forming the magnetic layer includes ketone such as acetone, methylethyl ketone(MEK), methylisobutyl ketone(MIBK), and cyclohexanone; alcohol such as methanol, ethanol, propanol, and butanol; ester such as methyl acetate, ethyl acetate, butyl acetate, ethyl lactate, propyl acetate, and ethyleneglycol monoacetate; ether such as diethyleneglycol dimethylether, 2-ethoxy ethanol, tetrahydrofuran, and dioxane; aromatic hydrocarbon such as benzene, toluene, and xylene; halogenated hydrocarbon such as methylene chloride, ethylene chloride, carbon tetrachloride, chloroform, ethylenechlorohydrin, and dichlorobenzene.

In mixing the components for a magnetic coating solution, a ferromagnetic powder, a binder and the other components ar put into a kneading machine simultaneously or one by one.

In the invention, a variety of kneading machines can be used: namely, a dual roll mill, a triple roll mill, a ball mill, a pebble mill, a sand grinder, a Sqegvari attriter, a high speed impeller disperser, a high speed stone mill, a high speed impact mill, a disper-kneader, a high speed mixer, a homogenizer, and a supersonic disperser.

For kneading and dispersing a ferromagnetic powder, a dispersant may be used.

The dispersant includes lecithin, phosphate, an amine compound, alkyl sulfate, fatty amide, higher alcohol, polyethylene oxide, sulfosuccinic acid, sulfosuccinate, a conventional surfactant and a salt thereof, a salt of a polymer dispersant having anionic organic group such as —COOH and —PO$_3$H.

They may be used independently or in combination.

The dispersant is added usually in an amount 0.1 to 10 parts by weight to 100 parts by weight of a ferromagnetic powder used.

The coating solution is coated on a non-magnetic support by a conventional method.

The coating method includes gravure roll coating, wire bar coating, doctor blade coating, reverse roll coating, dip coating, air knife coating, calender coating, squeeze coating, kiss coating, and fountain coating.

After a coating solution is coated, a wet magnetic layer is subjected to a magnetic field orientation treatment at 500 to 3000 Gauss, if required, and further to a surface smoothing treatment with a supercalender roll.

The surface smoothing treatment is usually carried out at a temperature of 60° to 80° C., and a pressure of 100 to 300 kg/m$^2$.

A dry thickness of a coated magnetic layer is 2.0 to 6.0 μm.

A backing layer is formed in the same manner as the magnetic layer.

The magnetic recording medium thus prepared were cut to a prescribed form to prepare a sample tape for evaluation.

EXAMPLES

The examples of the invention and the comparative examples are exhibited to detail the invention concretely. In the examples and the comparative examples, the term, 'part', represents 'part by weight'.

EXAMPLE 1

1. Formation of magnetic layer

The following components for a magnetic layer were mixed well stirring by a ball mill, and were further added 5 parts of polyfunctional isocyanate, Colonate L manufactured by Japan Polyurethane Industrial Co. The mixture was then filtrated through a filter having an average mesh size of 1 μm to prepare a magnetic paint.

| | |
|---|---|
| Co-containing γ-Fe$_2$O$_3$ powder | 100 parts |
| Alumina powder | 4 parts |
| Urethane elastomer, Estan 5701, manufactured by Goodrich Co. | 9 parts |
| Vinyl chloride-vinyl acetate copolymer, VAGH, manufactured by Union Carbide Co. | 6 parts |
| Lecithin | 4 parts |
| Myristic acid | 2 parts |
| Butyl palmitate | 1 part |
| Methyl ethyl ketone | 50 parts |
| Cyclohexanone | 100 parts |
| Carbon black, Conductex 975, manufactured by Columbian Carbon Co. | 3 parts |

The resulting magnetic paint was coated on a polyethylene terephthalate film having the following physical properties to a dry thickness of 4 μm to form a magnetic layer having the following physical properties.

| Physical properties of polyethylene terephthalate film | |
|---|---|
| Layer thickness | 14.0 μm |
| Number of protuberance having a height not lower than 0.1 μm | 20 /mm$^2$ |
| Young's modulus in a machine direction | 650 kg/mm$^2$ |
| Fracture strength in the machine direction | 35 kg/mm$^2$ |
| Elongation in a longitudinal direction | 70% |
| Physical properties of magnetic layer | |
| Rz | 0.06 μm |
| Young's modulus in a machine direction | 550 kg/mm$^2$ |

Next, the coated film was heated to remove the solvents and then subjected to a surface smoothing treatment with a supercalender roll.

2. Formation of backing layer

The following components for a backing layer was mixed stirring by a ball mill, and were further added 5 parts of polyfunctional isocyanate, Colonate L, manufactured by Japan Polyurethane Co. Then, the mixture was filtrated through a filter having an average mesh size of 1.5 82 m to prepare a paint for a backing layer.

| | |
|---|---|
| Carbon black, Conductex 975, manufactured by Columbian Carbon Co. | 11 parts |
| Urethan elastomer, Estan 5701, manufactured by Goodrich Co. | 6 parts |
| Nitrocellulose, Cellunoba BTH1/2, manufactured by Asahi Chemical Ind. Co. | 4 parts |
| Methyl ethyl ketone | 80 parts |

-continued

| | |
|---|---|
| Toluene | 60 parts |

The resulting paint for a backing layer was coated on a surface of the magnetic film provided with a magnetic layer, which was on a side opposite to the magnetic layer, to a dry thickness of 1.1 μm.

Next, the coated film was heated to remove the solvents and then cut into ½ inch width to prepare a magnetic tape for video.

The magnetic tape was evaluated as follow;

| Exposure of protuberances by calender treatment | |
|---|---|
| Almost no exposure | ∘ |
| Exposed protuberances: less than 50/mm$^2$ | Δ |
| Exposed protuberances: 100 or more | x |

Drop-out by protuberances

A running test was carried out with a VTR, JVC HR-7100 to count a frequency of drop-out per minute.

| | |
|---|---|
| 5/min. or less | ∘ |
| 6 to 20/min. | Δ |
| 21/min. or more | x |
| Transfer to magnetic layer | |
| Almost no transfer point | ∘ |
| Less than 10 transfer points/cm$^2$ | Δ |
| 11 or more transfer points/cm$^2$ | x |
| Wiping stain in cutting | |
| No stain | ∘ |
| Heavy stain | x |

Running durability

A running test was carried out with JVC HR-7100 over a period of 100 hours to observe edge folding of a tested tape.

| | |
|---|---|
| No edge folding observed | ∘ |
| Edge folding observed | x |
| No shaving of magnetic layer observed | ∘ |
| Saving of magnetic layer observed | x |

EXAMPLE 2

A magnetic tape was prepared and evaluated in the same manner as in Example 1, except that the polyethylene terephthalate film having the following physical properties was used.

| Physical properties of polyethylene terephthalate film | |
|---|---|
| Layer thickness | 14.0 μm |
| Number of protuberances of 0.1 μm or higher | 10 /mm$^2$ |
| Rz | 0.06 μm |
| Young's modulus in a machine direction | 650 kg/mm$^2$ |
| Fracture strength in a machine direction | 35 kg/mm$^2$ |
| Elongation in a machine direction | 70% |
| Physical properties of magnetic layer | |
| Rz | 0.06 μm |
| Young's modulus in a machine direction | 550 kg/mm$^2$ |

COMPARATIVE EXAMPLES

Comparative Example 1

A magnetic tape was prepared and evaluated in the same manner as in Example 1, except that the polyethylene terephthalate film having the following physical properties was used.

| Physical properties of polyethylene terephthalate film | |
|---|---|
| Layer thickness | 14.0 μm |
| Number of protuberances of 0.1 μm or higher | 50 /mm$^2$ |
| Rz | 0.07 μm |
| Young's modulus in a machine direction | 650 kg/mm$^2$ |
| Fracture strength in a machine direction | 35 kg/mm$^2$ |
| Elongation in a machine direction | 65% |
| Physical properties of magnetic layer | |
| Rz | 0.06 μm |
| Young's modulus in a machine direction | 550 kg/mm$^2$ |

Comparative Example 2

A magnetic tape was prepared and evaluated in the same manner as in Example 1, except that the polyethylene terephthalate film having the following physical properties was used.

| Physical properties of polyethylene terephthalate film | |
|---|---|
| Layer thickness | 13.8 μm |
| Number of protuberances of 0.1 μm or higher | 20 /mm$^2$ |
| Rz | 0.06 μm |
| Young's modulus in a machine direction | 550 kg/mm$^2$ |
| Fracture strength in a machine direction | 25 kg/mm$^2$ |
| Elongation in a machine direction | 100% |
| Physical properties of magnetic layer | |
| Rz | 0.06 μm |
| Young's modulus in a machine direction | 550 kg/mm$^2$ |

Comparative Example 3

A magnetic tape was prepared and evaluated in the same manner as in Example 1, except that the polyethylene terephthalate film having the following physical properties was used.

| Physical properties of polyethylene terephthalate film | |
|---|---|
| Layer thickness | 13.8 μm |
| Number of protuberances of 0.1 μm or higher | 10 /mm$^2$ |
| Rz | 0.05 μm |
| Young's modulus in a machine direction | 450 kg/mm$^2$ |
| Fracture strength in a machine direction | 20 kg/mm$^2$ |
| Elongation in a machine direction | 100% |
| Physical properties of magnetic layer | |
| Rz | 0.06 μm |
| Young's modulus in a machine direction | 550 kg/mm$^2$ |

Comparative Example 4

A magnetic tape was prepared and evaluated in the same manner as in Example 1, except that the magnetic paint and the polyethylene terephthalate film each having the following composition and properties were used.

| Composition of magnetic paint | |
|---|---|
| Co-containing γ-Fe$_2$O$_3$ powder | 100 parts |
| Alumina powder | 5 parts |
| Urethane elastomer, Estan 5701, manufactured by Goodrich Co. | 9 parts |
| Vinyl chloride-vinyl acetate copolymer, VAGH, manufactured by Union Carbide Co. | 6 parts |
| Lecithin | 4 parts |
| Myristic acid | 2 parts |
| Butyl palmitate | 1 part |
| Methyl ethyl ketone | 50 parts |
| Cyclohexanone | 100 parts |
| Carbon black, Conductex 975, manufactured by Columbian Carbon Co. | 3 parts |
| Physical properties of polyethylene terephthalate film | |
| Layer thickness | 14.8 μm |
| Number of protuberances of 0.1 μm or higher | 50 /mm$^2$ |
| Rz | 0.08 μm |
| Young's modulus in a machine direction | 650 kg/mm$^2$ |
| Fracture strength in a machine direction | 35 kg/mm$^2$ |
| Elongation in a machine direction | 60% |
| Physical properties of magnetic layer | |
| Rz | 0.10 μm |
| Young's modulus in a machine direction | 550 kg/mm$^2$ |

Comparative Example 5

A magnetic tape was prepared and evaluated in the same manner as in Example 1, except that the magnetic paint and the polyethylene terephthalate film each having the following composition and physical properties were used.

| Composition of magnetic paint | |
|---|---|
| Co-containing γ-Fe$_2$O$_3$ powder | 100 parts |
| Alumina powder | 6 parts |
| Urethane elastomer, Estan 5701, manufactured by Goodrich Co. | 9 parts |
| Vinyl chloride-vinyl acetate copolymer, VAGH, manufactured by Union Carbide Co. | 6 parts |
| Lecithin | 4 parts |
| Myristic acid | 2 parts |
| Butyl palmitate | 1 part |
| Methyl ethyl ketone | 50 parts |
| Cyclohexanone | 100 parts |
| Carbon black, Conductex 975, manufactured by Columbian Carbon Co. | 3 parts |
| Physical properties of polyethylene terephthalate film | |
| Layer thickness | 14.8 μm |
| Number of protuberances of 0.1 μm or higher | 200 /mm$^2$ |
| Rz | 0.08 μm |
| Young's modulus in a machine direction | 600 kg/mm$^2$ |
| Fracture strength in a machine direction | 35 kg/mm$^2$ |
| Elongation in a machine direction | 65% |
| Physical properties of magnetic layer | |
| Rz | 0.10 μm |
| Young's modulus in a machine direction | 550 kg/mm$^2$ |

Comparative Example 6

A magnetic tape was prepared and evaluated in the same manner as in Example 1, except that the magnetic paint and the polyethylene terephthalate film each having the following composition and physical properties were used.

| Composition of magnetic paint | |
|---|---|
| Co-containing γ-Fe$_2$O$_3$ powder | 100 parts |
| Alumina powder | 3 parts |
| Urethane elastomer, Estan 5701, manufactured by Goodrich Co. | 9 parts |
| Vinyl chloride-vinyl acetate copolymer, VAGH, manufactured by Union Carbide Co. | 6 parts |
| Lecithin | 4 parts |
| Myristic acid | 2 parts |
| Butyl palmitate | 1 part |
| Methyl ethyl ketone | 50 parts |
| Cyclohexanone | 100 parts |
| Carbon black, Conductex 975, manufactured by Columbian Carbon Co. | 3 parts |
| Physical properties of polyethylene terephthalate film | |
| Layer thickness | 14.0 μm |
| Number of protuberances of 0.1 μm or higher | 20 /mm$^2$ |
| Rz | 0.10 μm |
| Young's modulus in a machine direction | 650 kg/mm$^2$ |
| Fracture strength in a machine direction | 35 kg/mm$^2$ |
| Elongation in a machine direction | 70% |
| Physical properties of magnetic layer | |
| Rz | 0.08 μm |
| Young's modulus in a machine direction | 350 kg/mm$^2$ |

Comparative Example 7

A magnetic tape was prepared and evaluated in the same manner as in Example 1, except that a magnetic paint and a polyethylene terephthalate film each having the following composition and physical properties were used.

| Composition of magnetic paint | |
|---|---|
| Co-containing γ-Fe$_2$O$_3$ powder | 100 parts |
| Alumina powder | 3 parts |
| Urethane elastomer, Estan 5701, manufactured by Goodrich Co. | 5 parts |
| Vinyl chloride-vinyl acetate copolymer, VAGH, manufactured by Union Carbide Co. | 3 parts |
| Lecithin | 5 parts |
| Myristic acid | 4 parts |
| Butyl palmitate | 3 part |
| Methyl ethyl ketone | 50 parts |
| Cyclohexanone | 100 parts |
| Carbon black, Conductex 975, manufactured by Columbian Carbon Co. | 3 parts |
| Physical properties of polyethylene terephthalate film | |
| Layer thickness | 14.0 μm |
| Number of protuberances not lower than 0.1 μm | 20 /mm$^2$ |
| Rz | 0.06 μm |
| Young's modulus in a machine direction | 650 kg/mm$^2$ |
| Fracture strength in a machine direction | 35 kg/mm$^2$ |
| Elongation in a machine direction | 70% |
| Physical properties of magnetic layer | |
| Rz | 0.08 μm |
| Young's modulus a machine direction | 390 kg/mm$^2$ |

EXAMPLE 3

A magnetic tape was prepared and evaluated in the same manner as in Example 1, except that a polyethylene-2,6-naphthalate film having the following physical properties was used.

| Physical properties of polyethylene-2,6-naphthalate film | |
|---|---|
| Film thickness | 13.5 μm |
| Number of protuberances not lower than 0.1 μm | 20 /mm² |
| Rz | 0.06 μm |
| Young's modulus in a machine direction | 650 kg/mm² |
| Fracture strength in a machine direction | 35 kg/mm² |
| Elongation in a machine direction | 65% |
| Physical properties of magnetic layer | |
| Rz | 0.06 μm |
| Young's modulus a machine direction | 550 kg/mm² |

EXAMPLE 4

A magnetic tape was prepared and evaluated in the same manner as in Example 1, except that a polyamide film having the following physical properties was used.

| Physical properties of polyamide film | |
|---|---|
| Film thickness | 14.0 μm |
| Number of protuberances not lower than 0.1 μm | 20 /mm² |
| Rz | 0.07 μm |
| Young's modulus in a machine direction | 600 kg/mm² |
| Fracture strength in a machine direction | 32 kg/mm² |
| Elongation in a machine direction | 70% |
| Physical properties of magnetic layer | |
| Rz | 0.06 μm |
| Young's modulus a machine direction | 550 kg/mm² |

Comparative Example 8

A magnetic tape was prepared and evaluated in the same manner as in Example 1, except that a polyethylene-2,6-naphthalate film having the following physical properties was used.

| Physical properties of polyethylene-2,6-naphthalate film | |
|---|---|
| Film thickness | 13.5 μm |
| Number of protuberances not lower than 0.1 μm | 30 /mm² |
| Rz | 0.07 μm |
| Young's modulus in a machine direction | 480 kg/mm² |
| Fracture strength in a machine direction | 26 kg/mm² |
| Elongation in a machine direction | 70% |
| Physical properties of magnetic layer | |
| Rz | 0.06 μm |
| Young's modulus a machine direction | 550 kg/mm² |

Comparative Example 9

A magnetic tape was prepared and evaluated in the same manner as in Example 1, except that a magnetic paint and a polyethylene-2,6-naphthalate film each having the following composition and physical properties were used.

| Composition of magnetic paint | |
|---|---|
| Co-containing γ-Fe₂O₃ powder | 100 parts |
| Alumina powder | 3 parts |
| Urethane elastomer, Estan 5701, with the same composition and a ½ molecular weight, manufactured by Goodrich Co. | 4 parts |
| Vinyl chloride-vinyl acetate copolymer, VAGH, manufactured by Union Carbide Co. | 3 parts |
| Lecithin | 6 parts |
| Myristic acid | 4 parts |
| Butyl palmitate | 3 part |
| Butyl stearate | 3 part |
| Methyl ethyl ketone | 50 parts |
| Cyclohexanone | 100 parts |
| Carbon black, Conductex 975, manufactured by Columbian Carbon Co. | 5 parts |
| Physical properties of polyethylene-2,6-naphthalate film | |
| Film thickness | 13.5 μm |
| Number of protuberances not lower than 0.1 μm | 20 /mm² |
| Rz | 0.06 μm |
| Young's modulus in a machine direction | 650 kg/mm² |
| Fracture strength in a machine direction | 35 kg/mm² |
| Elongation in a machine direction | 65% |
| Physical properties of magnetic layer | |
| Rz | 0.03 μm |
| Young's modulus a machine direction | 350 kg/mm² |

Comparative Example 10

A magnetic tape was prepared and evaluated in the same manner as in Example 1, except that a polyamide film having the following physical properties was used.

| Physical properties of polyamide film | |
|---|---|
| Film thickness | 14.0 μm |
| Number of protuberances not lower than 0.1 μm | 25 /mm² |
| Rz | 0.07 μm |
| Young's modulus in a machine direction | 310 kg/mm² |
| Fracture strength in a machine direction | 28 kg/mm² |
| Elongation in a machine direction | 85% |
| Physical properties of magnetic layer | |
| Rz | 0.06 μm |
| Young's modulus a machine direction | 550 kg/mm² |

Comparative Example 11

A magnetic tape was prepared and evaluated in the same manner as in Example 1, except that a magnetic paint having the same composition as that of Comparative Example 9 and a polyamide film having the following composition and physical properties were used.

| Physical properties of polyamide film | |
|---|---|
| Film thickness | 14.0 μm |
| Number of protuberances not lower than 0.1 μm | 25 /mm² |
| Rz | 0.07 μm |
| Young's modulus in a machine direction | 750 kg/mm² |
| Fracture strength in a machine direction | 45 kg/mm² |
| Elongation in a machine direction | 65% |
| Physical properties of magnetic layer | |
| Rz | 0.03 μm |
| Young's modulus a machine direction | 350 kg/mm² |

The evaluation results of the Examples and Comparative Examples are shown in Table 1.

TABLE 1

| | Exposure of protuberance produced by calender | Drop-out caused by protuberance | Transfer to magnetic layer | Stain of wiping in slitting | Running durability (edge folding) | Shaving of magnetic layer |
|---|---|---|---|---|---|---|
| Example 1 | c | c | c | o | c | c |
| Example 2 | c | c | o | c | c | c |
| Example 3 | c | c | c | c | c | c |
| Example 4 | c | o | c | c | o | o |
| Comparative Example 1 | Δ | x | c | o | o | c |
| Comparative Example 2 | c | c | c | x | x | o |
| Comparative Example 3 | c | c | c | x | x | c |
| Comparative Example 4 | x | x | x | c | o | c |
| Comparative Example 5 | x | x | x | c | c | c |
| Comparative Example 6 | c | c | Δ | o | c | c |
| Comparative Example 7 | c | c | c | c | c | x |
| Comparative Example 8 | c | c | c | x | x | c |
| Comparative Example 9 | c | c | c | c | x | x |
| Comparative Example 10 | c | c | c | x | x | c |
| Comparative Example 11 | o | c | c | o | o | x |

As is obvious from Table 1, the magnetic recording medium of the invention comprising of a support and a magnetic layer each having the physical properties regulated within the scope of the invention is free of exposed protuberances and transfer thereof to a magnetic layer; further, it is free of drop-out caused by the protuberances, and comprises an excellent running durability.

What is claimed is:

1. A magnetic recording medium having a support and provided thereon a magnetic layer, wherein said support comprises physical properties of:
   a. a thickness: not more than 15.5 μm,
   b. a number of a protuberance having a height of not lower than 0.1 μm: not more than 30/mm$^2$,
   c. a surface roughness (Rz): 0.04 to 0.09 μm,
   d. a Young's modulus in a machine direction: not less than 550 kg/mm$^2$,
   e. a fracture strength in a machine direction: not less than 30 kg/mm$^2$, and
   f. an elongation: not less than 60%, said magnetic layer comprising ferromagnetic particles dispersed in a binder comprises physical properties of:
   g. a surface roughness (Rz): not more than 0.09 μm,
   h. a Young's modulus in a machine direction: not less than 400 kg/mm$^2$.

2. The medium of claim 1, wherein said thickness of the support is 7.5 to 15.5 μm.

* * * * *